Jan. 31, 1933.    F. W. KOHLER    1,895,803
CHAIR CONSTRUCTION
Filed July 28, 1927    7 Sheets-Sheet 3
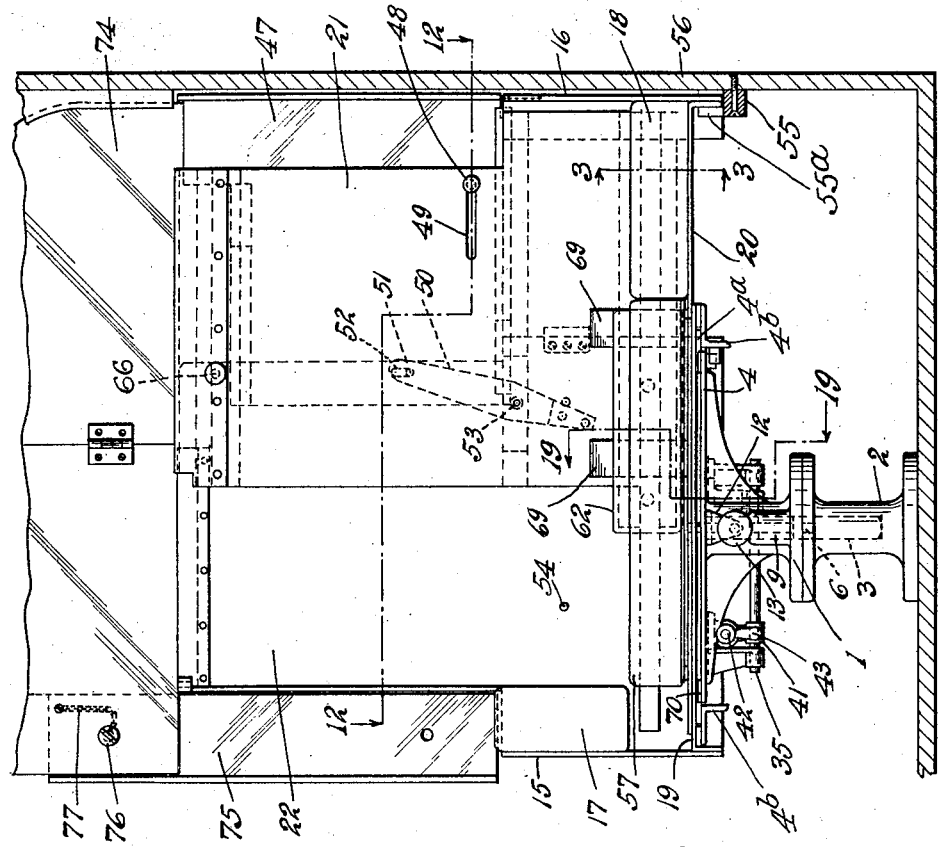
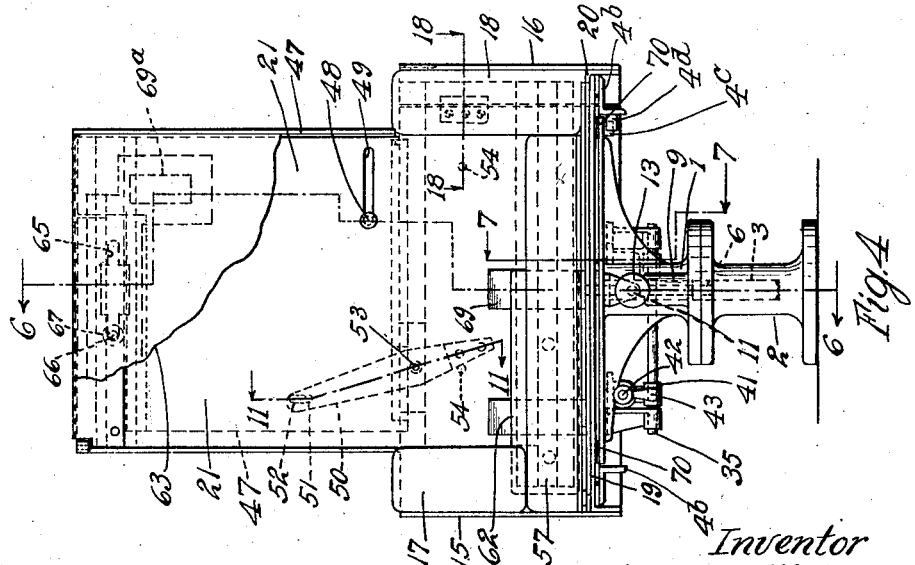
Inventor
Franklin W. Kohler
by Parker & Carter
Attorneys

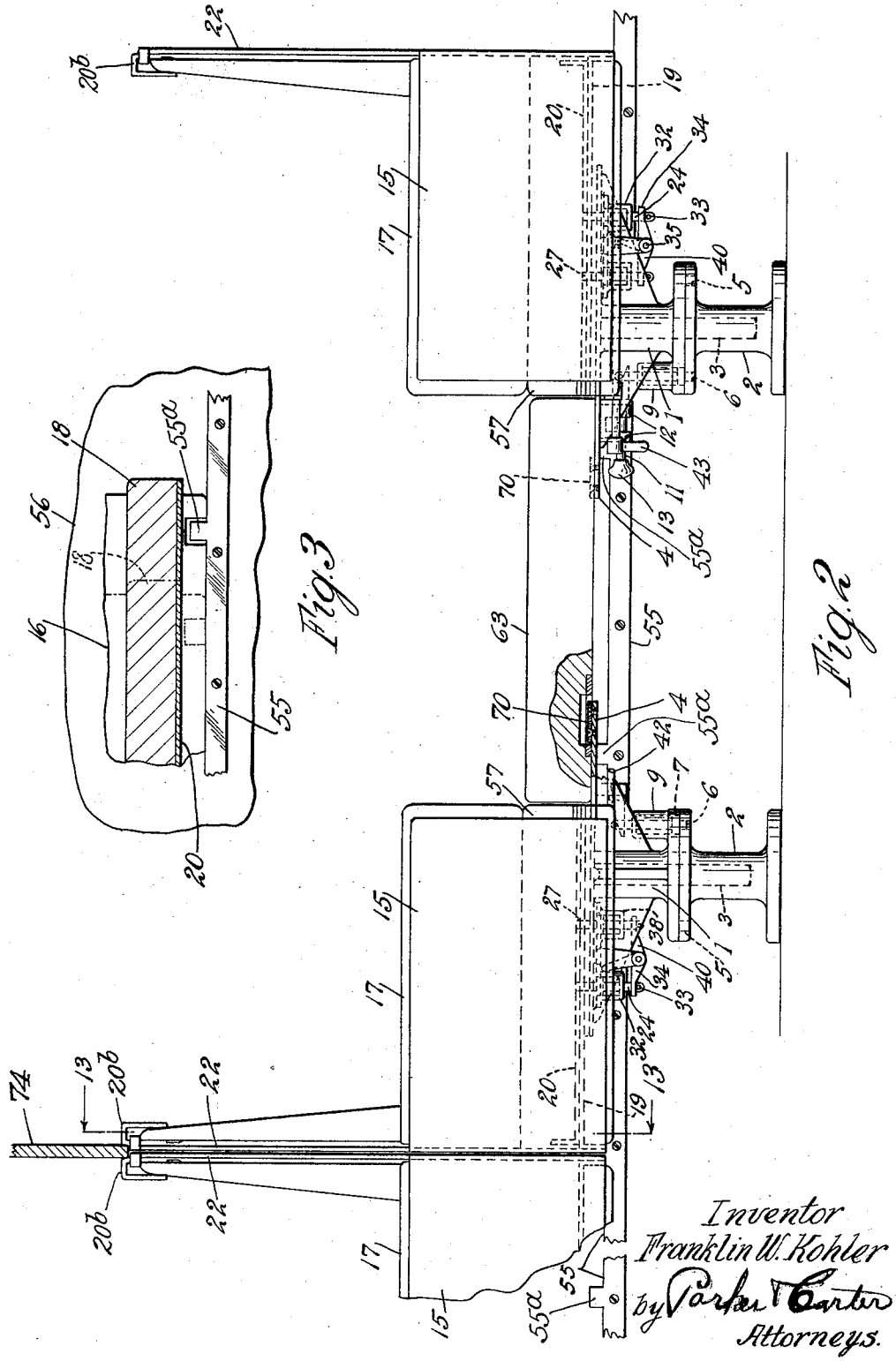

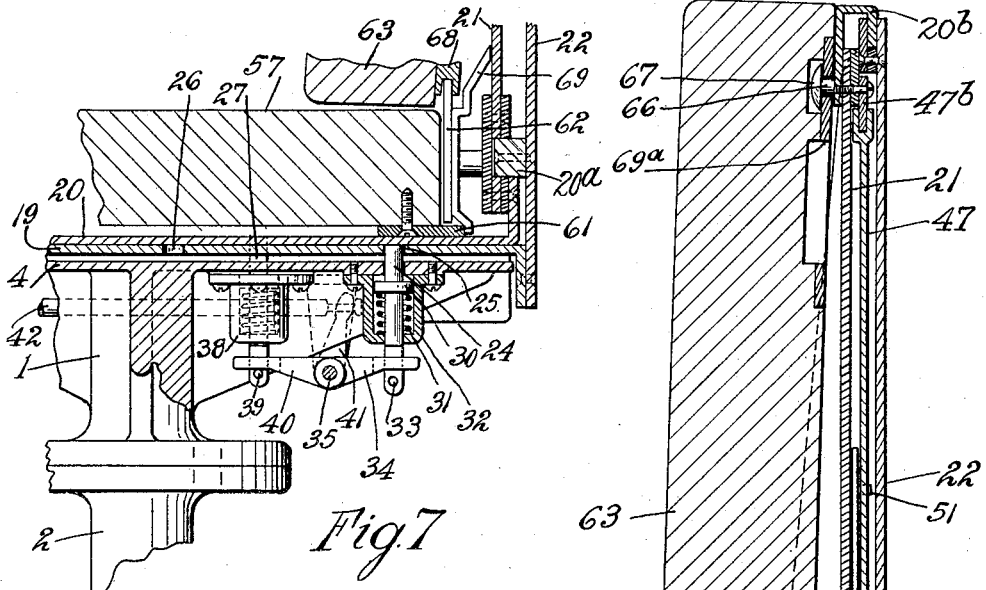
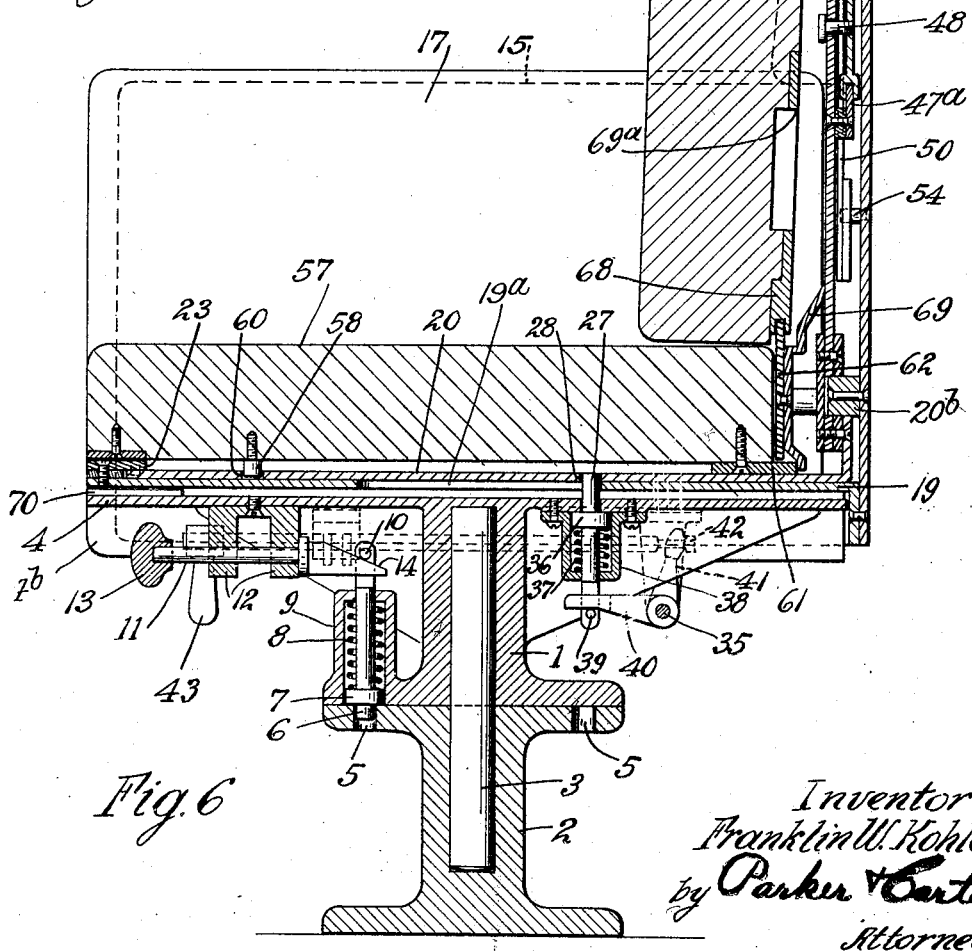

Jan. 31, 1933.  F. W. KOHLER  1,895,803
CHAIR CONSTRUCTION
Filed July 28, 1927    7 Sheets-Sheet 5

Inventor
Franklin W. Kohler
by Parker & Carter
Attorneys.

Jan. 31, 1933.　　　F. W. KOHLER　　　1,895,803
CHAIR CONSTRUCTION
Filed July 28, 1927　　　7 Sheets-Sheet 6
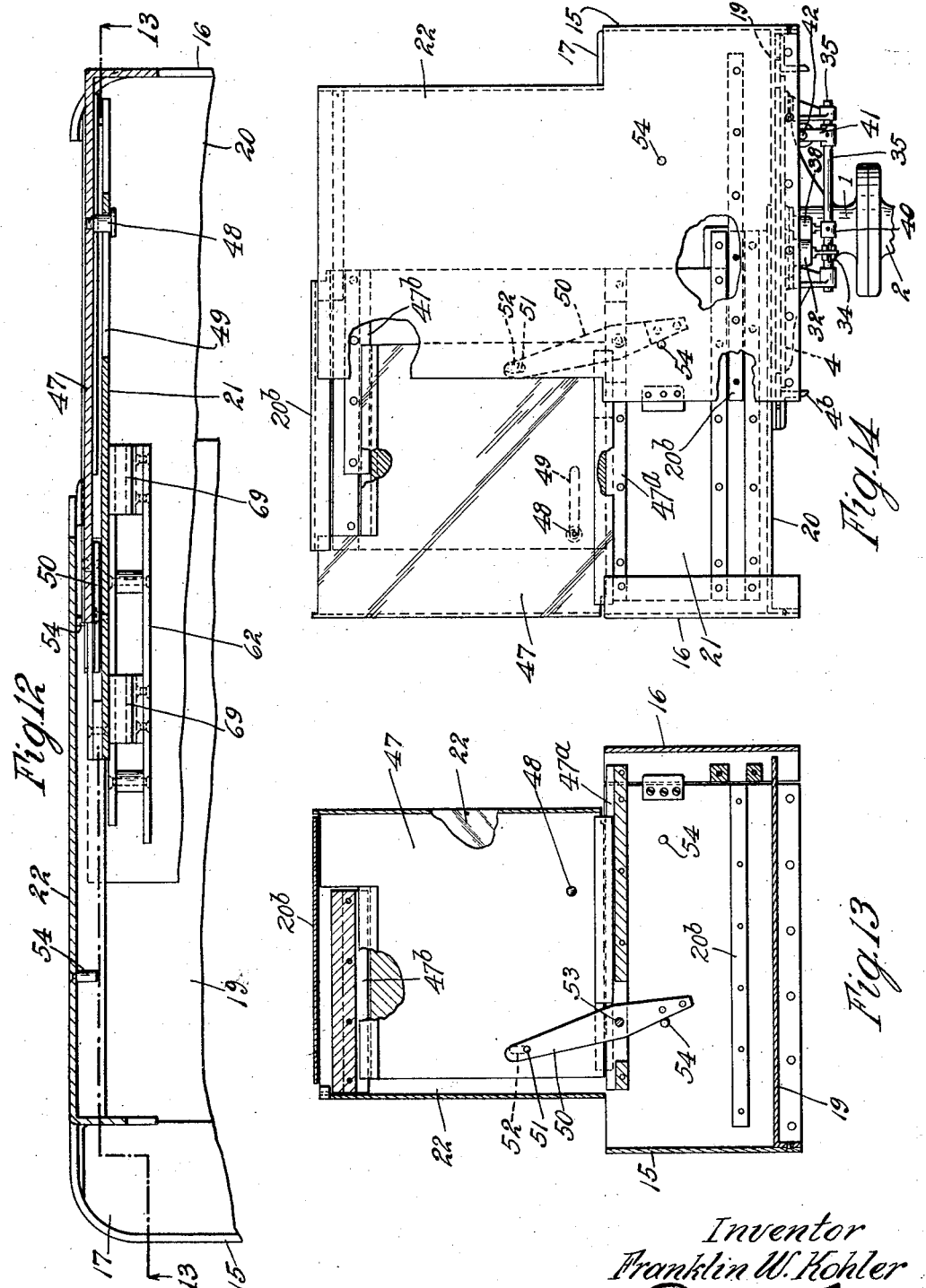
Inventor
Franklin W. Kohler
by Parker & Carter
Attorneys.

Inventor
Franklin W. Kohler
by Parker & Carter
Attorneys

Patented Jan. 31, 1933

1,895,803

UNITED STATES PATENT OFFICE

FRANKLIN W. KOHLER, OF CHICAGO, ILLINOIS

CHAIR CONSTRUCTION

Application filed July 28, 1927. Serial No. 209,052.

This invention relates to improvements in chair constructions, and has for its object to provide a new and improved device of this description. The invention has as a further object to provide a chair which can be used as a chair and which can also be arranged so that two of the chairs may be formed into a berth. The invention has as a further object to provide a chair that can be adjusted to different widths. The invention has further objects which are more particularly pointed out in the accompanying description.

Referring now to the drawings,—

Fig. 2 is a side elevation of the construction illustrated in Fig. 1;

Fig. 3 is a sectional view on line 3—3 of Fig. 5;

Fig. 4 is a front elevation of a chair embodying the invention when adjusted to form a chair;

Fig. 5 is a front elevation of the chair illustrated in Fig. 4 when the parts are adjusted to form a berth or bed;

Fig. 6 is an enlarged sectional view taken on line 6—6 of Fig. 4;

Fig. 7 is an enlarged sectional view taken on line 7—7 of Fig. 4;

Fig. 12 is an enlarged sectional view taken on line 12—12 of Fig. 5;

Fig. 13 is a sectional view taken on line 13—13 of Figs. 2 and 12 showing parts in closed position;

Fig. 14 is a rear elevation of the chair with the parts in their adjusted positions;

Like numerals refer to like parts throughout the several figures. This application is of the type of chair shown in my co-pending application 209,053 filed July 28, 1927.

Figure 1:
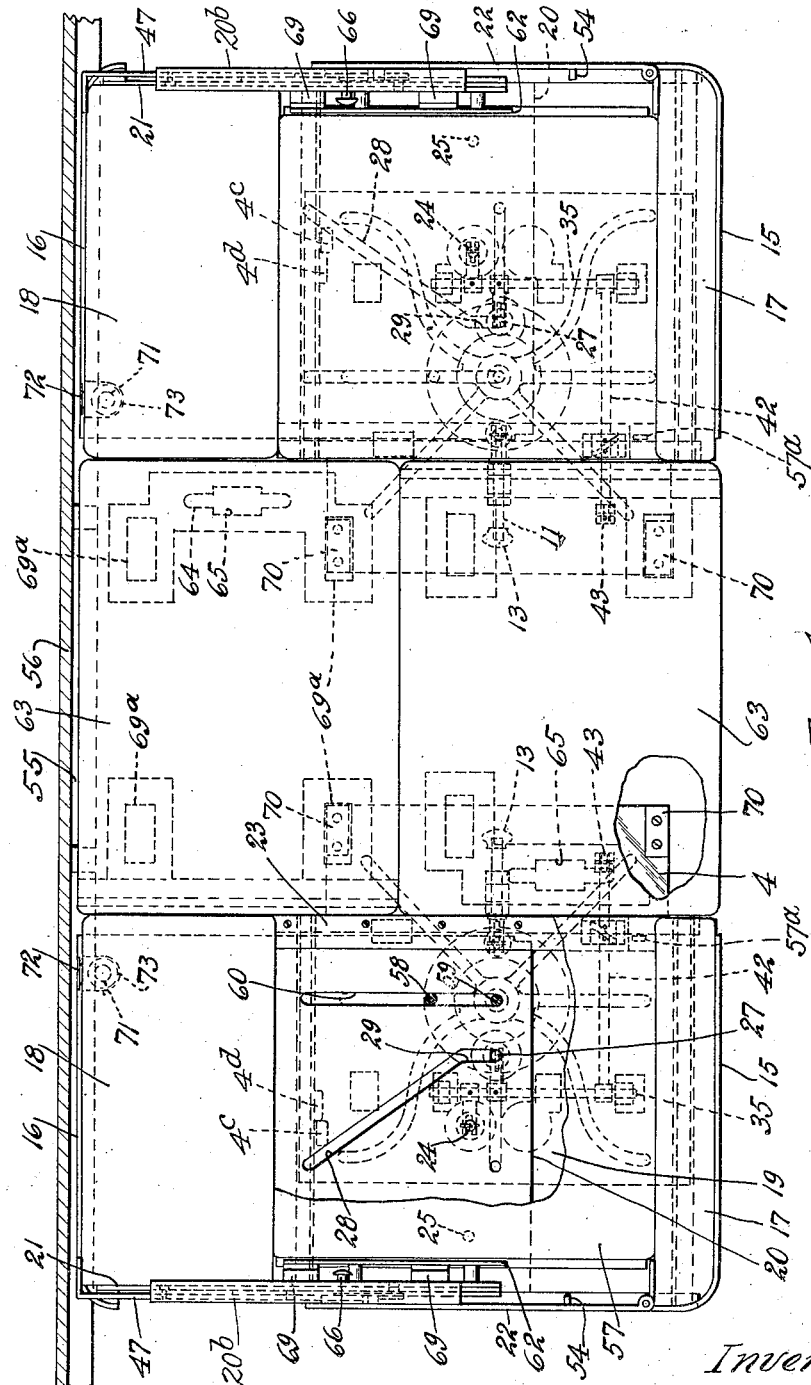
Fig. 1 is a plan view showing two chairs adjusted to form a berth or bed, with the back cushions between them.

In Fig. 1 of the drawings I have shown two chairs in their adjusted positions, with the back cushions placed between them ready to form a berth or bed. Each chair is provided with a base 1 mounted upon a pedestal 2. A shaft 3 connects the base and the pedestal and projects into each one so as to form a strong connection which permits rotation of the chair on the pedestal. The base 1 is provided with a base plate 4. Some means is provided for locking the base in any desired position with relation to the pedestal. As herein shown, the pedestal is provided with a series of openings 5 to receive the end of a pin 6. This pin is provided with a shoulder 7 which limits its movement toward the pedestal. A spring 8, inclosed in a cylinder 9, normally presses the pin toward the pedestal so as to normally hold it in its locked position. Some means is provided for moving the pin to disconnect the base and the pedestal. As herein shown, the pin is provided with a projection 10. A rod 11 is mounted in guides 12 connected with the base plate 4 and is arranged to be moved longitudinally in said guides. This rod is provided with a handle 13 and an inclined engaging face 14, which engages the projection 10 when the rod is moved longitudinally in one direction. This lifts the pin 6 so as to disconnect it from the pedestal. The chair may then be rotated so as to move it to the desired position. The rod 11 is then moved in the opposite direction and the spring forces the pin into one of the openings 5 in the pedestal.

Figure 8:
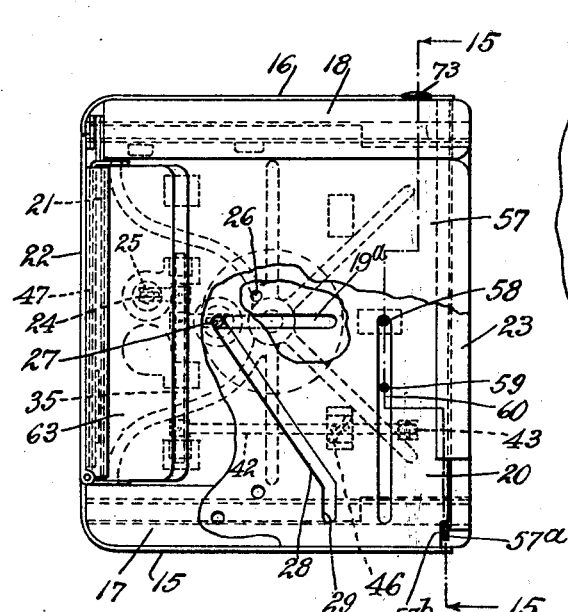
Fig. 8 is a top plan view of the chair with the cushions and one of the plates broken away.
Figure 10:
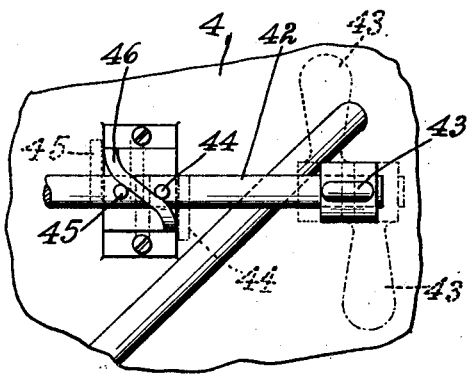
Fig. 10 is an enlarged bottom plan view of parts shown in Fig. 9.
Figure 9:
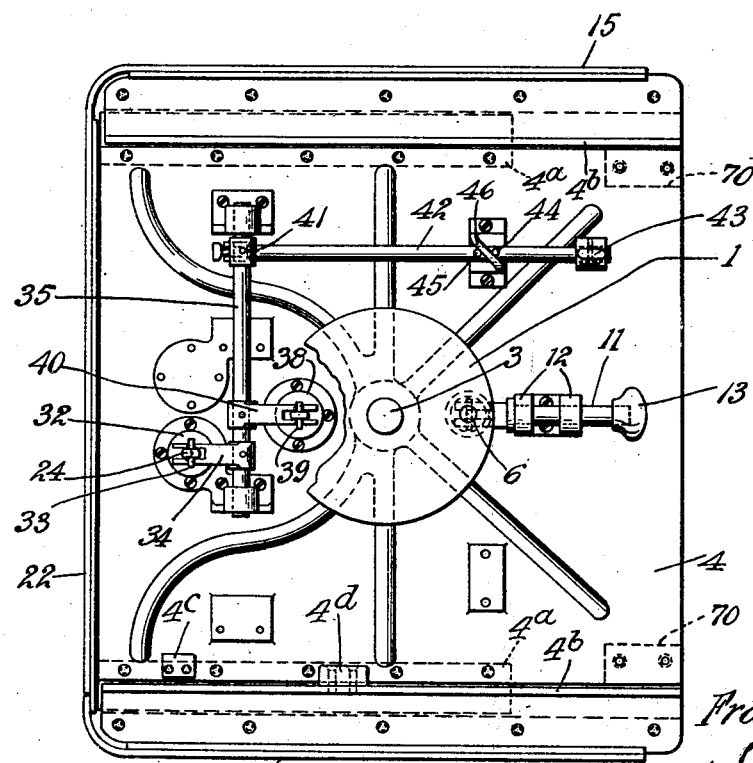
Fig. 9 is a bottom plan view of the chair removed from the pedestal.
Figure 15:
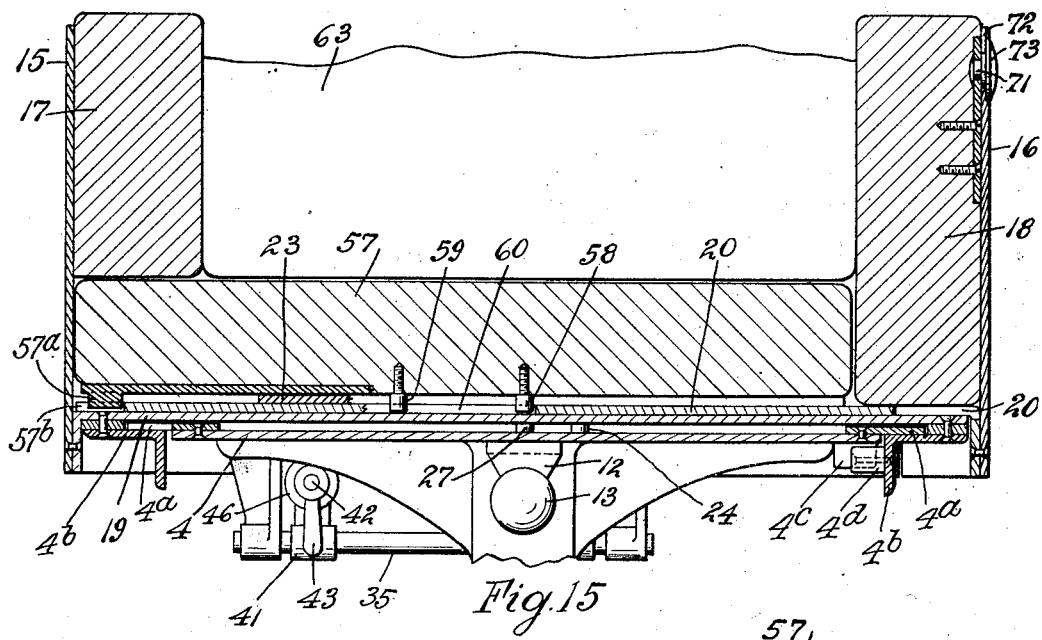
Fig. 15 is an enlarged sectional view taken on line 15—15 of Fig. 8.
Figures 18, 19:
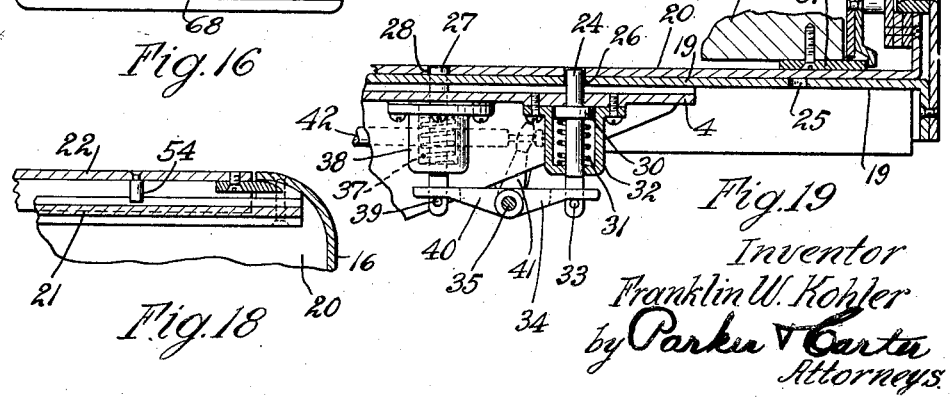
Fig. 18 is a sectional view taken on line 18—18 of Fig. 4.
Fig. 19 is an enlarged sectional view taken on line 19—19 of Fig. 5.

Some means is provided for adjusting the chair so as to increase its width and for also increasing the width of the back. The chair is provided with two side pieces 15 and 16, which with the cushions 17 and 18 act as the arms of the chair. The side piece 15 is connected with the bottom 19 (see Figs. 4, 5 and 15). The arm side piece 16 is connected with the sliding bottom plate 20. The plate 4 and bottom 9 have stops which limit the lateral motion. The back of the chair is formed of sections 21 and 22. The back section 21 is connected with the sliding bottom plate 20 and the back section 22 is connected with the bottom 19. The sliding bottom plate 20 slides laterally with regard to the bottom 19 and is held from upward movement by the guide 23 attached to the bottom. The bottom and the sliding bottom plate may be moved back and forward along the base plate 4. Some means is provided for locking the bottom base plate and sliding plate together when the chair is in its normal position, and for unlocking them and permitting them to be moved to widen the chair and to be moved backward or forward along the base plate. In the construction shown, these parts are locked by means of movable pins. The bottom 19 and sliding bottom plate 20 are locked together by the pin 24, which is connected with the base plate 4 and which passes through openings in said parts as shown in Fig. 19. The pin 24 passes through the hole 25 when the parts are in their normal position, and through the hole 26 when the bottom is moved to the rear. The bottom and bottom sliding plate are moved to the rear along the base plate 4 by the pin 27, which works in a diagonal slot 28 in the sliding bottom plate (see Fig. 8). This pin also works in slot 19a of bottom 19. This diagonal slot has a straight portion 29 at the end. The pins 24 and 27 are controlled by the same controlling device. As herein shown, pin 24 is provided with a shoulder 30 which limits its upward movement. A spring 31, located in a housing 32 (see Figs. 9 and 19), normally holds the pin in its locking position. The pin is provided with an engaging part 33 which is engaged by an arm 34 on a rock shaft 35. The pin 27 is provided with a shoulder 36 which limits its upward movement and is held in its locking position by a spring 37 located in a housing 38 (see Fig. 6). The pin 27 is provided with an engaging part 39 which is engaged by an arm 40 on the shaft 35, this being the same shaft to which the arm 34 is attached. The shaft 35 is connected by an arm 41 with a shaft 42, which is rotatably mounted in suitable bearings attached to the base plate 4 (see Fig. 9).

The shaft 42 is provided with a handle 43 by means of which it is rocked. This shaft is provided with means for moving it longitudinally. As herein shown, it is provided with the projections 44 and 45, which engage a cam 46. When the handle 43 is moved to one side, the shaft 42 is moved longitudinally in one direction so as to rock the shaft 35 and move the arm 34 to release the pin 24. When said handle is moved to the other side, the shaft is moved longitudinally in the other direction and rocks the shaft 35 so as to move arm 40 and unlock pin 27. It will thus be seen that the two pins are controlled by the same mechanism.

Figure 11:
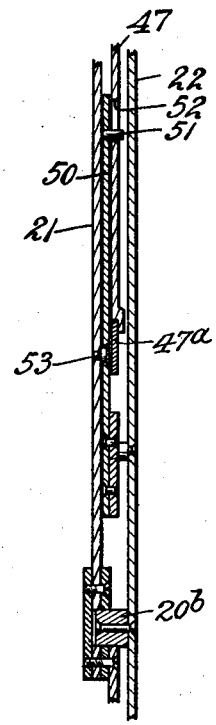
Fig. 11 is an enlarged sectional view taken on line 11—11 of Fig. 4.

The back section 21 slides along guides 20a and 20b on section 22, Fig. 6, and is provided with a sliding part 47. This sliding part is provided with a pin 48 which works in a slot 49 in the back section 21 and slides along guides 47a and 47b connected with section 21. When the back section 21 is slid to one side, this sliding part is also moved outwardly to fill the space above the arm cushion 18. The sliding part 47 is controlled by a lever 50, which is located intermediate the back sections 21 and 22 (see Figs. 4, 5 and 11). The lever 50 is provided with a pin 51 which works in a slot 52 in the sliding piece 47. The lever 50 is pivoted by the pivot 53 with the back section 21. A projection 54 on the other back section is associated with the lower end of this lever. When the sliding bottom plate and the back section 21 are slid laterally, this lever moves the sliding piece 57 outwardly, the parts taking the position shown in Fig. 5. When the sliding bottom plate is slid outwardly, it is supported by the support 55 on the wall 56.

Figures 16, 17:
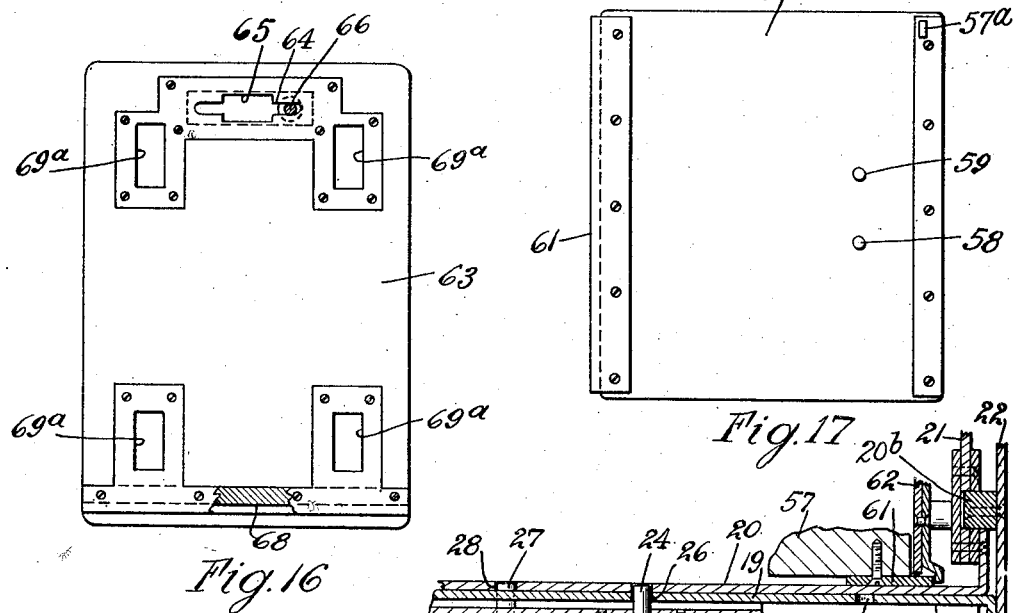
Fig. 16 is a rear view of the back cushion.
Fig. 17 is a bottom view of the seat cushion.

The chair is provided with a bottom cushion 57. This cushion is provided with projections 58 and 59, which slide in a groove 60 in the sliding bottom plate 20, and with a projection 57a engaging notch 57b in plate 20. The bottom cushion is also provided with a projecting plate 61 which projects under the support 62 for the back cushion 63. The back cushion is provided with a slot 64 having the enlarged portion 65. The back section 21 is provided with a pin 66, having an enlarged end 67. This enlarged end is placed in the enlargement of the slot 65 and the pin is then slid to the narrow portion (see Fig. 16), so as to hold the upper part of the back cushion against outward movement. The back cushion is provided at the bottom with the grooved holding piece 68, into the groove of which is received the support 62 (see Fig. 6). A guiding piece 69 guides the back into proper position. The back is also provided with the openings 69a. The base plates 4 of the chairs are provided with the projections 70 (see Figs. 1 and 2), which fit into these openings 69a when the back cushion is placed between the chairs as shown in Fig. 1. These projections and openings prevent the backs from being accidentally displaced. When the chairs are to be used as a berth, two of the adjacent chair tops are rotated so as to face each other; the handle 43 is then moved so as to release the bottom and sliding bottom plate and to insert the pin 27 in the diagonal slot; the arms of the chair are then moved apart and this slides the sliding bottom plate laterally and causes both the sliding bottom plate and the bottom to be moved rearwardly and the back sections to be moved so as to bring the parts in their adjusted position. The seat cushion is also slid out from under the arm cushion 17. The arm cushion 18 is removably connected to the side piece 16 by means of a pin 71, which works in a slot 72, and which is provided with an enlarged end 73 which holds the cushion against lateral movement. This arm cushion is lifted so as to lift the pin out of the slot and is then placed between the seat cushion 57 and the side piece 16, as shown in Fig. 5, the other parts being as shown in said figure. The back cushions are then removed and placed in position between the two chairs, as shown in Figs. 1 and 2. The device is now ready to receive the proper bedding to make a berth or bed. When the chairs are used in sleeping cars and are made up into berths, the usual partitions 74 are placed between the berths, as shown in Fig. 5. These partitions have connected therewith the sliding part 75, which may be slid down to cover the space above the arm cushion 17. The piece 75 is held in position by a pin 76 connected with the partition by chains 77.

It will thus be seen that I have here a chair construction wherein the chairs may be used as ordinary chairs. It will further be seen that such chairs can be widened so as to form double chairs—that is, a chair for two people. It will further be seen that the chairs can be adjusted so as to be changed into beds or berths. When these chairs are used on cars, for example, the car may be used in the daytime as a chair car and at night as a sleeping car. Where the car makes a day run between cities, the car can be used going in one direction in the daytime as a chair car, and can be returned at night as a sleeping car, thus keeping the car continuously in use and reducing the number of cars necessary where the ordinary chair car and sleeping car are used.

Rail 55 on the car is preferably provided with lugs 55a to elevate the back cushion the proper height (see Figs. 2 and 3). The lugs 57a on cushion 57 which work in notches 57b in sliding bottom 20, cause the cushion to be moved back to closing position when the bottom parts are moved to this position. They also relieve the strain on pin 58. The seat can be widened when pin 27 is withdrawn from diagonal slot 28 so that the chairs can be used as single chairs or double chairs. The seat can be both widened and deepened for a bed by withdrawing pin 24 from hole 25. The base plate 4 is provided with guides 4a which fit in between the bottom 19 and the angles 4b connected with said bottom so that the bottom 19 and associated parts can be slid back upon the base plate 4 when the pin 24 is withdrawn from the hole 28 in the sliding bottom plate 20. During this movement the pin 27 slides in slot 19a in the bottom 19.

The third section 47 of the back is moved automatically with the lateral movement of the section 21 being actuated by the lever located between the sections 47 and 21.

I claim:

1. A chair construction comprising a bottom, a support upon which said bottom is rotatably mounted, a thin sliding bottom plate associated with said bottom, means for sliding said sliding bottom plate to widen the bottom of the chair, and a back having two overlapping thin sections, one connected with said bottom and the other with said sliding bottom plate the sliding of the bottom and the back forming a widened chair to permit an additional person to sit therein.

2. A chair construction comprising a bottom, a sliding bottom plate associated with said bottom, means for sliding said sliding bottom plate to widen the bottom of the chair, a back having two sections one connected with said bottom and the other with said sliding bottom plate, and a third section for said back and means for moving said third section so that it will project beyond its associated section when the sliding bottom plate is moved to its extended position.

3. A chair construction comprising a base, a bottom thereon, a sliding bottom plate adapted to be slid with relation to said bottom to widen the chair, the bottom and sliding bottom plate being movably mounted on said base so that they may be moved with relation thereto, a locking device disconnected from the bottom and sliding bottom plate while they are being moved for locking the bottom and sliding bottom plate in their adjusted or unadjusted positions, said locking device also acting to lock said bottom and sliding bottom plate to said base.

4. A chair construction comprising a base, a seat rotatably mounted on said base and having a plurality of thin sections slidably connected together, a back having a plurality of thin sections slidably connected together, and means for moving the seat sections and back sections relatively to widen the seat and the back, while the device remains a chair, to permit an additional person to sit therein, said seat and back sections being slidably connected with said base, and a vertical guiding device associated with said seat sections.

5. A chair construction comprising a base, a seat having a plurality of sections slidably connected together, a back having a plurality of sections slidably connected together, means for moving the seat sections and back sections relatively to widen the seat and the back, said seat and back sections being slidably connected with said base, and locking devices disconnected from the bottom and sliding plate when they are being moved for locking the seat to said base and for locking the sections of the seat together.

6. A chair construction comprising a base, a seat having a plurality of sections slidably connected together, a back having a plurality of sections slidably connected together, means for moving the seat sections and back sections relatively to widen the seat and the back, said seat and back sections being slidably connected with said base, locking devices disconnected from the bottom and sliding plate when they are being moved for locking the seat to said base and for locking the sections of the seat together, and a single controlling handle for controlling said locking devices.

7. A chair construction comprising a base, a bottom, means for extending said bottom, a back consisting of three vertically extending overlapping sections, a pivoted lever connecting two said sections, and means for simultaneously extending said three sections to widen said back.

8. A chair construction comprising a base, a seat, a back having a plurality of overlapping sections movably connected together, a lever pivoted to one section and movably connected with another of said sections, and means for moving said lever to move the sections relatively.

9. A chair construction comprising a base, a seat, a back having a plurality of overlapping sections movably connected together, a lever pivoted to one section and movably connected with another of said sections, and means for moving said lever to move the sections relatively, said latter means simultaneously extending the seat of the chair.

10. A chair construction comprising a base, a bottom rotatably mouted on said base, a sliding bottom plate connected with said bottom, the bottom and bottom plate being movably connected with said base, and means for simultaneously sliding said sliding bottom plate and moving both the bottom and the bottom plate with relation to said base.

11. A chair construction comprising a base, a bottom, a sliding bottom plate, a slot in said bottom, a slot in said sliding bottom plate at an angle to the slot in the bottom, a projecting part connected with the base and adapted to project into said slots, whereby when the sliding plate is slid both the sliding plate and the bottom are moved with relation to said base.

12. A chair construction comprising a base, a bottom, a sliding bottom plate, a slot in said bottom, a slot in said sliding bottom plate at an angle to the slot in the bottom, a projecting part connected with the base and adapted to project into said slots whereby when the sliding plate is slid both the sliding plate and the bottom are moved with relation to said base, and means for removing said projection from said slot in said sliding bottom plate so that the sliding bottom plate may be slid without moving said bottom.

13. A chair construction comprising a base, a bottom, a sliding bottom plate, a slot in said bottom, a slot in said sliding bottom plate at an angle to the slot in the bottom, a projecting part connected with the base and adapted to project into said slots whereby when the sliding plate is slid both the sliding plate and the bottom are moved with relation to said base, means for removing said projection from said slot in said sliding bottom plate so that the sliding bottom plate may be slid without moving said bottom, a handle for moving said projecting part in and and out of said slots, and a locking device for locking the bottom and the bottom plate together, said locking device controlled by said handle.

14. A chair construction comprising a base, a bottom, a sliding bottom plate, a slot in said bottom, a slot in said sliding bottom plate at an angle to the slot in the bottom, a projecting part connected with the base and adapted to project into said slots whereby when the sliding plate is slid both the sliding plate and the bottom are moved with relation to said base, means for removing said projection from said slot in said sliding bottom plate so that the sliding bottom plate may be slid without moving said bottom, a handle for moving said projecting part in and out of said slots, a locking device for locking the bottom and the bottom plate together, said locking device controlled by said handle, and a locking device for locking the sliding plate in the bottom to said base, said latter locking device also controlled by said handle.

15. A chair construction comprising a base, a bottom, a sliding bottom plate connected with said bottom, two arms one connected with said bottom and the other with said sliding bottom plate, cushions for said arms, a cushion for said bottom projecting under one of the arm cushions, and means for moving said bottom cushion out from under the arm cushion when the sliding bottom plate is slid with relation to said bottom.

Signed at Chicago, county of Cook, and State of Illinois, this 8th day of July 1927.

FRANKLIN W. KOHLER.